United States Patent [19]

Boasson

[11] Patent Number: 5,301,339
[45] Date of Patent: Apr. 5, 1994

[54] SYSTEM FOR DYNAMIC COMMUNICATION AMONG SUBSYSTEMS IMPLEMENTING DATA REQUESTS BY DATA TYPE AND LOCATING DATA BY DATA TYPE MATCHING

[75] Inventor: Maarten Boasson, Borculo, Netherlands

[73] Assignee: Hollandse Signaalapparaten B.V., Hengelo, Netherlands

[21] Appl. No.: 600,275

[22] Filed: Oct. 17, 1990

Related U.S. Application Data

[63] Continuation of Ser. No. 133,679, Dec. 16, 1987, abandoned.

[30] Foreign Application Priority Data

Dec. 16, 1986 [NL] Netherlands ............... 8603193

[51] Int. Cl.⁵ .......................................... G06F 13/00
[52] U.S. Cl. .................................. 395/800; 364/243; 364/253.1; 364/282.1; 364/241; 364/DIG. 1; 395/600
[58] Field of Search ................. 395/600, 800, 425

[56] References Cited

U.S. PATENT DOCUMENTS

| | | | |
|---|---|---|---|
| 3,771,135 | 11/1973 | Huettner | 395/275 |
| 4,004,283 | 1/1977 | Bennett | 395/725 |
| 4,313,162 | 1/1982 | Baum et al. | 364/200 |
| 4,323,967 | 4/1982 | Peters et al. | 364/200 |
| 4,384,325 | 5/1983 | Slechta | 364/200 |
| 4,468,728 | 8/1984 | Wang | 364/200 |
| 4,476,528 | 10/1984 | Matsumoto et al. | 364/200 |
| 4,477,881 | 10/1984 | Kobayashi | 364/900 |
| 4,504,907 | 3/1985 | Manning | 364/200 |
| 4,589,093 | 5/1986 | Ippolito | 364/900 |
| 4,591,967 | 5/1986 | Mattes | 364/200 |
| 4,604,686 | 8/1986 | Reiter et al. | 364/200 |
| 4,611,298 | 9/1986 | Schuldt | 364/900 |
| 4,630,196 | 12/1986 | Bednar | 364/200 |
| 4,635,189 | 1/1987 | Kendall | 364/200 |
| 4,677,550 | 6/1987 | Ferguson | 364/200 |
| 4,694,396 | 9/1987 | Weissbaar et al. | 364/300 |
| 4,754,395 | 6/1988 | Weisshaar et al. | 364/200 |
| 4,769,772 | 9/1988 | Dwyer | 364/200 |
| 4,870,568 | 9/1989 | Kahle | 364/200 |
| 4,884,218 | 11/1989 | Agnew | 364/513 |
| 5,014,192 | 5/1991 | Mansfield | 395/600 |

Primary Examiner—Eric Coleman
Attorney, Agent, or Firm—Oblon, Spivak, McClelland, Maier & Neustadt

[57] ABSTRACT

A communication system comprises a bus system and a number of subsystems which produce and process information, each subsystem being coupled to the bus system by a respective interface. A subsystem makes requests for information of a desired type, including an indication of such type of information, and also produces information which includes an indication of the type of produced information, information request from a subsystem are coupled by its interface to the bus system, the interface also supply the subsystem with information received from the bus system of a type requested by such subsystem and which originated from one or more other subsystems. The interface supplies the bus system with information produced by the subsystem when a request for that type of information has been received from the bus system. Since communication via the bus system is based on types of information rather than addressing of particular subsystems, the configuration of the communication system is substantially independent of the number and variety of the subsystems therein.

11 Claims, 3 Drawing Sheets

SYSTEM FOR DYNAMIC COMMUNICATION AMONG SUBSYSTEMS IMPLEMENTING DATA REQUESTS BY DATA TYPE AND LOCATING DATA BY DATA TYPE MATCHING

This is a continuation of application Ser. No. 133,679, filed Dec. 16, 1987, now abandoned.

The invention relates to a database system which comprises a network and a number of data-producing and data-processing subsystems connected to this network.

Similar generally known systems are often applied in real-time systems, e.g. for measuring and controlling chemical production processes, air traffic control systems involving several operators working at different subsystems, and interlinked workstations functioning as subsystems and spread out over a ship.

A prerequisite of such a system is that it be operational at any time. This is usually realised by duplicating the entire system, with both systems operating synchronously. This solution, however, has the disadvantage of being rather complicated and therefore very expensive. The life cycle of a database system is generally so long that several revisions of the system are carried through. Modernisation of e.g. one subsystem generally necessitates modification of parts of the database system, because the various subsystems are interdependent. This interdependence is due for instance to the fact that the various subsystems address each other both when requesting and when sending information. The present invention has for its object to solve the indicated problem by isolating the various subsystems from each other to a certain degree, while communication between the subsystems remains possible.

According to the invention, this is realised in that a subsystem, of which several are included in the database system, is suitable for making requests to the network for the supply of information of a particular type in case the subsystem needs this information and for presenting the network with information produced by the subsystem including an indication of the type of this information, while the network is suitable for accepting information presented by the subsystem including an indication of the type of this information and for supplying accepted information of a particular type to a subsystem in case the last-mentioned subsystem requests information of the last-mentioned type.

Because subsystems do not address each other, but instead use the type of the information to be sent as a selection criterion, the subsystems are highly independent of each other. A subsystem does not need to "know" which other subsystems there are and is therefore independent of the network configuration. As a result, only the essential parts of the database system need to be duplicated, while the synchronisation of the duplicated subsystem is automatically maintained. It is also possible to add one or more updated subsystems to the network, or to replace subsystems by other subsystems without having to adapt the original subsystems. This, too, is a direct result of the fact that the information type determines whether a subsystem accepts this information.

A subsystem may also produce information which cannot be processed by certain or by all subsystems without causing hindrance to the said subsystems or the interconnecting bus system. Consequently, a subsystem needs to be suitable only for supplying information produced by the subsystem with the accompanying type indication, for requesting the required information of a particular type, and for accepting the information presented. If a bus system is used in the network, it is possible to connect a subsystem via an interface with the bus system to create a database system. The bus system may be of a generally known type.

According to the invention, an interface thereto comprises facilities for:

sending a request, via the bus system, for the supply of a particular type of information in case the subsystem belonging to an interface requests information of the said type;

accepting information produced by the subsystem belonging to the interface, including an indication of the type of the information;

supplying the bus system with a particular type of information in case the interface, via the bus system, receives from another interface connected to the bus system, a request for the supply of information of the particular type, if the subsystem belonging to the second-last mentioned interface produces the information in question;

accepting from the bus system the information of the type requested by the subsystem belonging to the interface, and supplying the accepted information to the said subsystem.

A cost-effective version of a database system according to the invention will be further explained with reference to the accompanying drawings, in which FIG. 1 is a possible embodiment of a database system according to the invention;

Figure 1:
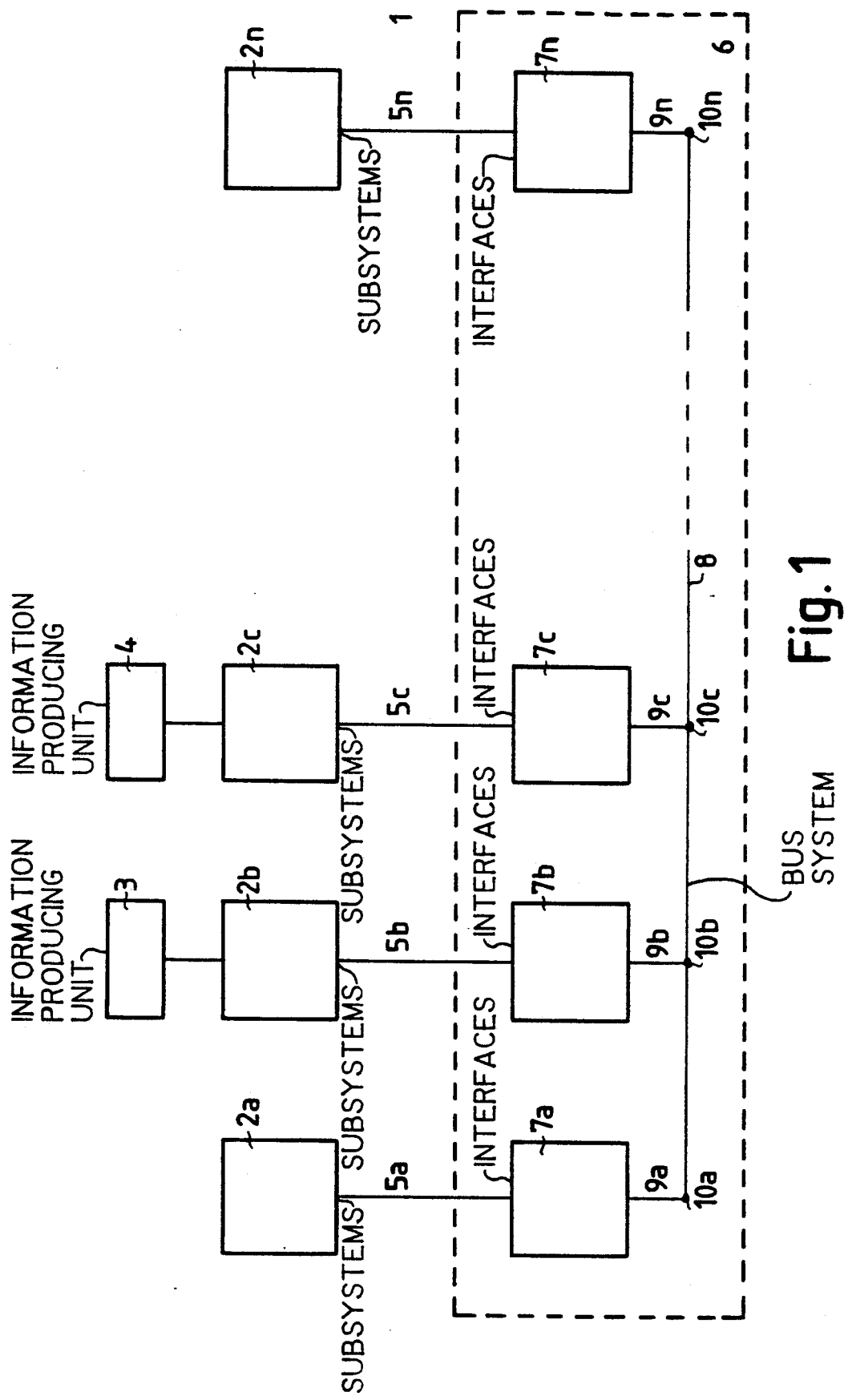

FIG. 1 shows a database system I according to the invention. It includes a number of subsystems $2a-2n$, which are usually not identical. A subsystem $2i$ is a system which can process and/or produce data. Subsystem $2b$ is, by way of example, connected to an information-producing unit 3. The information-producing unit 3 may e.g. be carried out as a radar apparatus, an infrared camera, or a sonar apparatus. Subsystem $2c$ is, byway of example, connected to a terminal 4, at which an operator is engaged. The operator can examine or enter data. Subsystem $2n$ can e.g. be configured as an independent calculator, which carries out calculations for other subsystems. All subsystems $2a-2n$ are linked via lines $5a-5n$ with network 6, which handles the message traffic among the various subsystems.

Communication among the various subsystems is subject to the following rules, among others:

a subsystem requiring information of a particular type requests network 6 to supply this information;

when a subsystem produces information, this subsystem supplies the said information and the information type indication to network 6;

network 6 supplies the information of a particular type to the subsystems requesting the information of the particular type when this information is available in the network.

The fact that the subsystems are not aware of each other's presence results in an extremely flexible system, since the message traffic among subsystems is now based on the information type, which renders addressing superfluous. A subsystem therefore does not need to "know" the other subsystems, making the system configuration extremely flexible.

Various possibilities exist to realise a network 6 possessing the required characteristics. For instance, it is possible to have one single processor execute all functions of network 6. Referring to FIG. 1, however, a network will be discussed which includes several processor-network interfaces 7a-7n. An interface 7a-7n links a subsystem 2a-2n with a bus system 8 belonging to the network by means of lines 5a-5n, 9a-9n and bus taps 10a-10n. Bus system 8 may be of a generally known type. The communication among the various subsystems 2a-2n by means of interfaces 7a-7n is explained with reference to an example: information exchange between subsystem 2i and subsystem 2j. It should be borne in mind that the characteristics described of subsystems 2i and 2j and of interfaces 7i and 7j respectively are present in all subsystems and interfaces respectively.

The subsystems will generally be of different types, while the interfaces are identical. In simple form, the communication will be as follows:

If the subsystem 2i requires information of a particular type, a request is made via line 5i to interface 7i for the supply of the said information;

Interface 7i sends, via line 9i and bus system 8, a request to each interface 7j linked to the bus system to supply the said information. To that effect the bus system uses "broadcast".

Interface 7j stores all the information presented by subsystem 2j via line 5j, together with the information type indication. In this context, subsystem 2j may be provided with facilities to determine whether information produced by the subsystem is of local or global value. Only in the latter case will a subsystem proceed to present information to the corresponding interface;

In case interface 7j has stored information of a particular type while interface 7i received a request for the supply of information of the particular type via line 9j, interface 7j supplies this information to bus system 8 via line 9j;

In case interface 7i is presented with information of a particular type by bus system 8 while interface 7i has received a request for the supply of the particular type of information from subsystem 2i via line 5i, interface 7i accepts the particular type of information. The accepted information can subsequently be presented to subsystem 2i. The presentation of the particular type of information may occur either immediately after reception of the information from bus system 8, or at a subsequent request of subsystem 2i for the supply of information of the type in question. In a special version of the interface, discussed below, a version with a so-called subscription service, the information accepted by interface 7i is transferred immediately to subsystem 2i after the first request of subsystem 2i for the information in question, while subsequently the information accepted by the interface is only supplied to subsystem 2i at a next request of subsystem 2i.

Thanks to the subscription service, the speed and effectiveness of the database system is considerably improved. For instance, a subsystem may produce information which cannot be processed by any of the subsystems connected to bus system 8 without needlessly loading bus system 8 or another interface. In the latter case, a subscription is not opened so that the relevant information is not supplied to bus system 8.

Figure 2:
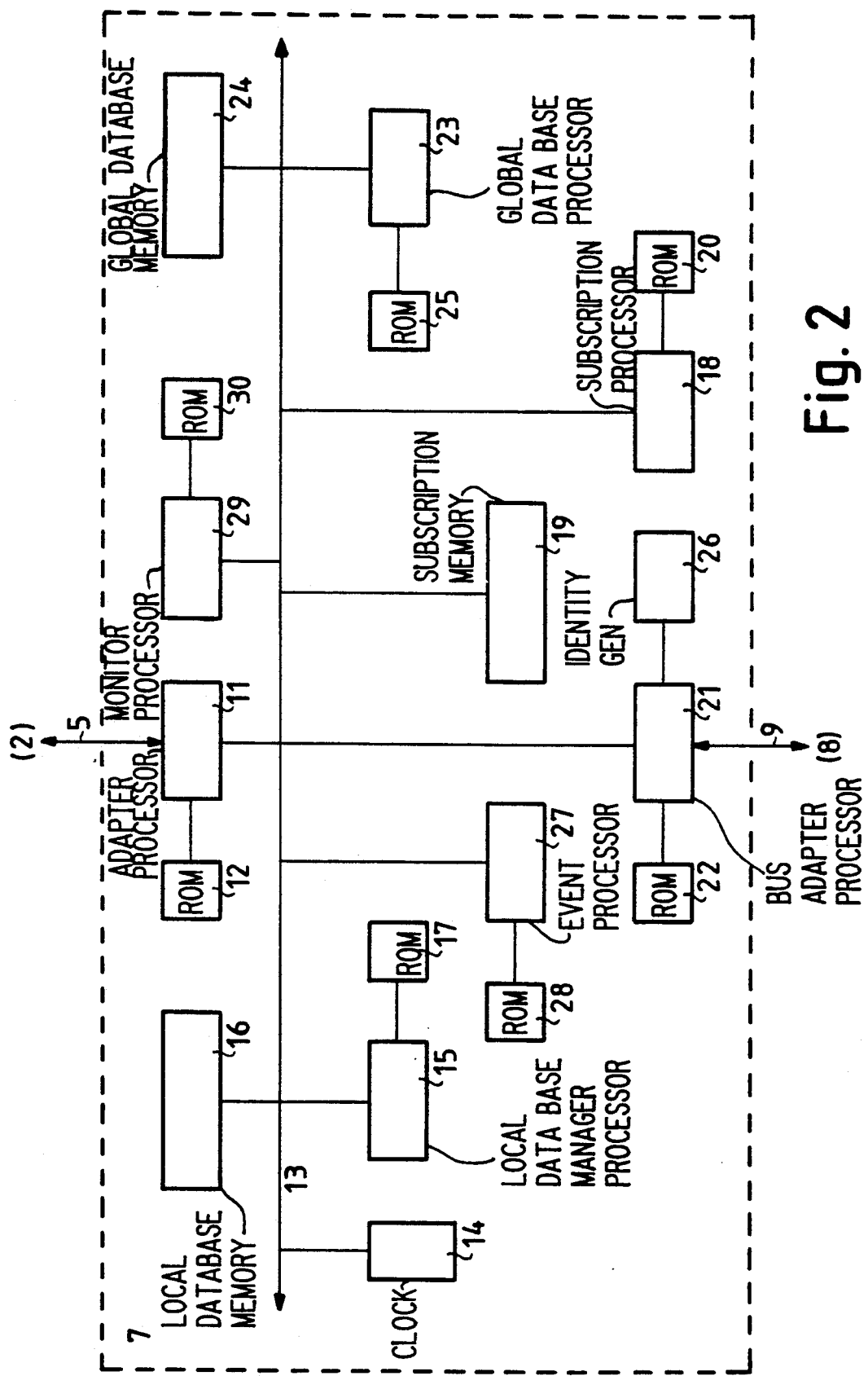
FIG. 2 is a possible embodiment of an interface.

The communication among the various subsystems 2a-2n by means of the special version of interfaces 7a-7n mentioned above, will be further explained with reference to FIG. 1 and FIG. 2, where FIG. 2 represents the special version of interfaces 7a-7n.

In the further discussion of a random interface 7i, the index i will be omitted (FIG. 2). In case a subsystem 2 produces information with the accompanying information type indication, the complete information will be supplied to interface 7 via line 5. This information is processed by means of an adapter processor 11, of which the corresponding program is stored in a ROM memory 12. All microprocessors present in an interface are interconnected via an internal bus 13, which bus is provided with a system time by means of a clock 14. Last-mentioned process is of such a nature that further operations to be carried out in the interface are simple to implement. The information is stored in a local database memory 16 via bus 13 under control of a local database manager processor 15. The software of local database manager 15 is stored in a ROM memory 17. If subsystem 2 requests the interface 7 via line 5 to supply the information of a particular type, this request is stored in a subscription memory 19 under control of a subscription processor 18. The software for processor 18 is stored in a ROM memory 20. Information with the corresponding type indication, which is available on bus system 8, is supplied to a bus adapter processor 21 via line 9. The software for processor 21 is stored in ROM memory 22. The information and corresponding type indication adapted by processor 21 are supplied to internal bus 13. Subscription processor 18 checks whether the information from the bus system is of a type which is stored in subscription memory 19. If this is the case, implying that the subsystem requested this type of information, the information in question is stored in a global database memory 24 under control of a global database manager processor 23. The software for processor 23 is stored in a ROM memory 25. Each time new information of the same type becomes available on bus system 8, this information is again stored in global database memory 24 as described above. In this process, old information of the particular type is overwritten if this information originates from the same interface connected to the bus system. If the new information of the particular type originates from a different interface, the information in question is stored in a separate memory position in global database memory 24. No overwriting therefore takes place in case of information of the same type originating from different interfaces. Global database processor 23 is suitable to distinguish information originating from different interfaces. This is made possible by providing each interface with an identity generator 26. An identity generator 26 allows processor 21 to add a parameter I to information which is supplied to bus system 8. The parameter I enables origin determination of information within network 6.

The character of a subscription appears from the repeated acceptance of information of a particular type which becomes available on the bus system, as from the moment subsystem 2 made a first request for the relevant information. The character of a subscription also appears from the repeated supply to the bus system of new information generated by a subsystem as from the moment the interface received the first request via the bus system for the supply of the information in question. This process will be discussed below. It is very probable that a subsystem making a first request for information of a particular type will make another request for this information in the near future. In this way, a new request from the subsystem for the information in question can be immediately complied with by supplying the information from the global database memory 24 to the subsystem. In case several interfaces have supplied information of the type in question to bus system 8, all of which is stored separately in memory 24 under control of parameter I, the question arises which information should be supplied to the subsystem when this subsystem makes another request for the information in question.

This problem can be solved by supplementing information with a quality indication of the information in question. This quality indication is also generated by the subsystems. In this example, the quality indication is formed by parameters $Q_o$, $t_o$ and $\tau$, where $Q_o$ is the instantaneous quality of the information at the moment of production, $t_o$ is the moment of production and $\tau$ a half life of the quality. Parameter $\tau$ thus indicates how long it takes before the quality of the information is reduced by half. Parameter $t_o$ is derived by means of clock 14. Because a situation may change in the course of time, it is possible that information which is a function of this situation changes in the course of time, thus reducing in quality. The quality indication in question is also stored in memory 24. At a new request of the subsystem to supply information of a particular type at moment t, processor 23 can select the best information by means of parameters $Q_o$, $t_o$ and $\tau$, on the basis of the formula:

$$Q(t) = Q_o \frac{1}{2}^{\frac{t-t_o}{\tau}}$$

Figure 3:
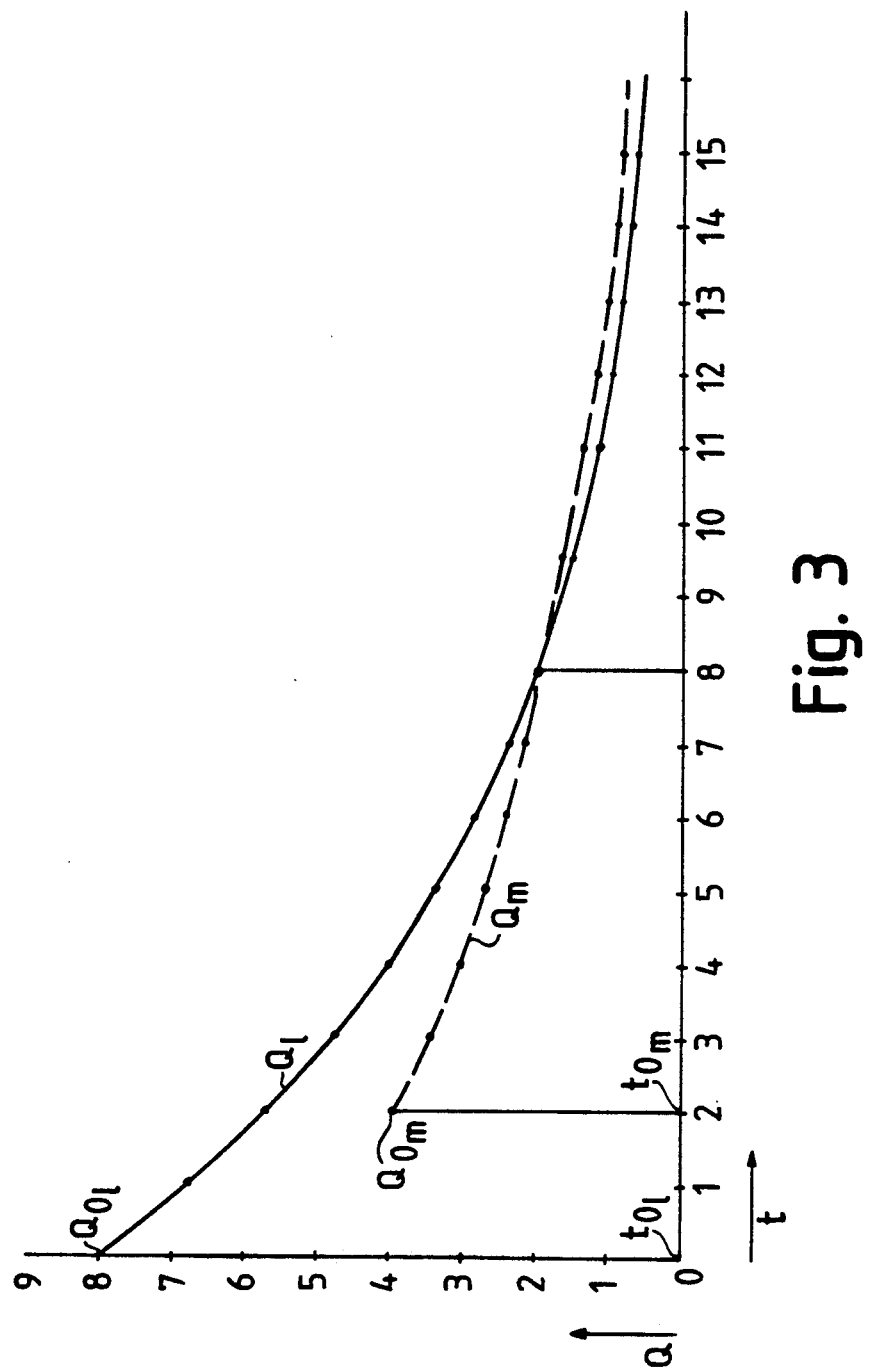
FIG. 3 is an example of time-dependent quality information.

FIG. 3 shows an example.

The information originating from interface n has quality parameters $Q_o=8$, $t_o=0$ and $\tau=4$, while the information originating from interface m has quality parameters $Q_o=4$, $t_o=2$ and $\tau=6$. FIG. 3 shows that the quality $Q_n$ of the information originating from interface 1 is higher than the quality $Q_m$ of the information originating from interface m, as long as $0<t<8$. This implies that processor 23 will supply the information originating from interface n if subsystem 2 requests this information at a moment $t<8$. In case $t\geq 8$, the information originating from interface m will be presented. If $Q_n=Q_m$ the interface will make a random choice. It should be clear that it is also possible to use different quality parameters and different formulas. The formulas may even be a function of parameter I.

Thanks to the subscription service it is possible to realise that a subsystem is immediately supplied with the best information available at the moment the subsystem requests information of the type in question. For special applications it is possible that a subsystem not only requests the information of the best quality but makes a special request for all information of a particular type available at that moment. This enables observations of different sensors to be correlated with each other in order to construct a virtual observation, which subsequently can be presented to the network with a higher degree of quality than the quality of the individual observations.

When a subsystem makes a first request for the supply of information of a particular type, and thus opens a subscription, this type of information is stored upon reception from bus system 8 in the database memory 24, while the information in question is simultaneously presented to subsystem 2. At a subsequent reception of new information of the said type, this information will only be inserted in database memory 24. Supply of this information, which is stored in database memory 24, to the subsystem occurs at a new request from the subsystem for information of the type in question as described above.

A special application is created when subsystem 2 requests a message in case new information of a particular type becomes available in interface 7 via bus system 8. This saves subsystem 2 from having to wait for the information in question and repeatedly making requests for information of the type in question. This implies that subsystem 2 may in the mean time be otherwise engaged because it will be automatically informed when interface 7, belonging to subsystem 2, receives new information of the type in question. A request from subsystem 2 to interface 7 for a message when new information of a particular type becomes available via bus system 8 also implies opening of a subscription if it concerns a first request for the information in question.

At a certain point, subsystem 2 may decide it is no longer interested in information of a particular type. A subscription opened by a first request for the supply of information of a particular type will then be terminated by a stop order generated by the subsystem. Subscription processor 18 recognises the order and erases the subscription for information of the type in question from memory 19. It is also possible that the interface autonomously terminates a subscription in case information of a particular type is received but no longer requested by the corresponding subsystem.

When subsystem 2 makes the first request to corresponding interface 7 for the supply of information of a particular type and thus opens a subscription, bus adapter processor 21 sees to it that this request is also supplied to bus system 8. The same applies to a stop order generated by subsystem 2 or by interface 7. In both cases, parameter I, characteristic of the relevant interface, is supplied to bus system 8. A request for the supply of information or stop order to terminate the supply of information of a particular type, supplied to bus system 8 in an analogous manner by a different interface, is received by bus adapter processor 21 and presented to internal bus 13. Subscription processor 18, in reaction to such a request, sees to it that a subscription is opened for the supply of information of the type in question produced by subsystem 2 to bus system 8, if the subsystem belonging to the interface is capable of producing the information in question. To this effect, subscription memory 19 contains all types of information the relevant subsystem is capable of producing. The request for supply of information of a type which the subsystem is capable of producing is stored in the subscription memory 19. The storage of this request is executed on the basis of the corresponding parameter I for each requesting interface. Subscription processor 18, in reaction to a stop order received from bus system 9, sees to it that the request for the supply of information of the type in question to bus system 8 is erased from subscription memory 19. The erasure of the relevant request is executed for each requesting interface on the basis of the parameter I received together with and belonging to the stop order. Subscription processor 18 sees to it that every time new information of the type in question is produced by subsystem 2, this information is supplied to bus system 8 via processor 21, as long as at least one interface having made a request for information of the type in question is recorded in subscription memory 19. If a request for supply of information of a particularly type is received via bus system 8 for the first time, resulting in the opening of a subscription for supply of information to bus system 8, processor 18 sees to it that the information in question is directly supplied to bus system 8 if this information is already stored in memory 16. Subsequently, the relevant information is supplied to bus system 8 each time subsystem 2 produces new information of the type in question. The information in question is of course accompanied by quality parameters generated by the subsystem and by parameter I generated by the interface. The interfaces making the request for the information in question will accept the information supplied to bus system 8 and further process it as described above.

The database system also has provisions for ensuring that, upon initialisation of the entire system, all subsystems can start producing information. Difficulties could arise if subsystems need each other's information for the production of new information. In that case, these subsystems would have to wait for each other with the production of new information. To prevent this, a subsystem which has just been activated subsequently provides to interface 7 all types of information it is capable of producing. It may happen that a certain type of information is not yet available, e.g. as a result of the dependence described above. In that case, the information of the type in question is supplied anyway, however, with a quality parameter $Q_o=0$. The relevant types are stored in subscription memory 19. It can be proven by induction that all subsystems are capable of producing the required information if it is assumed that the database system contains at least one subsystem which, independent of other subsystems, is capable of producing information. It is quite possible that, during the initialisation stage of the database system, requests for information are lost. For instance, a subsystem may not yet be operational during the initialisation stage because the software required for that subsystem has not yet been loaded. Other subsystems, however, may be immediately operational, because the software required for these subsystems is stored in a ROM memory. In case an interface belonging to a subsystem which is not yet operational requests information of a particular type via the bus system, this interface is not capable of deciding whether this request should be stored in subscription memory 19. This is caused by the fact that it is not yet known which types of information the relevant subsystem is capable of producing. To prevent the loss of such requests for information, during the initialisation stage an interface may store all requests for information of a particular type in subscription memory 19. If, at a certain moment, the software required for the subsystem is loaded, interface 2 can then check which requests for information the subsystem belonging to this interface can ever comply with. This is done on the basis of the information generated by the subsystem during initialisation, if applicable including a quality parameter $Q_o=0$. The requests which cannot be complied with are erased. Subsequently, the interface leaves the initialisation stage and stores requests for information of a particular type only if the subsystem belonging to the interface can produce the information in question.

A particularly cost-effective version is created when an interface is provided with an event processor 27 (see FIG. 2). A ROM memory 28 contains the software for event processor 27. Event processor 27 is included in interface 7 with the purpose of recognising special types of information received via bus system 8. The information concerned is of a type which is not regularly generated by a subsystem and supplied to bus system 8. Subsystem 2 will inform event processor 27 in advance concerning the separate types of information that can be processed or can no longer be processed by subsystem 2. An example of this type of information is a fire alarm generated by a subsystem and supplied to interface 7, which supplies it to bus system 8 with priority. After the fire alarm in question is received via bus system 8 by event processor 27, it is with priority supplied to subsystem 2 belonging to the said event processor 27 if subsystem 2 is capable of processing the information in question. Subsequently, the said subsystem can react immediately to the fire alarm. A second example of information recognised by event processor 27 concerns information generated by a monitor processor 29. A ROM memory 30 contains the software for the monitor processor 29. Monitor processor 29 checks the functioning of the database system. If monitor processor 29 discovers that the database system does not function properly, monitor processor 29 generates an alarm signal which is supplied to bus system 8. Upon reception via bus system 8, such a signal is recognised by the event processor 27 and processed as described above.

Monitor processor 29 checks for instance whether a request from corresponding subsystem 2 for information of a particular type results in the reception of this information via bus system 8. If, after a certain period of time, the relevant information has not been received, while the database system is designed in such a way that each request for information of a particular type can be complied with, this implies that an interface or subsystem in the system does not function properly. Because the identity of the producer of the information in question is not known, nothing can be decided concerning the identity of the malfunctioning interface or subsystem.

This problem can be solved by providing the database system with a special subsystem 2a, which is the only subsystem having full knowledge of the database system configuration (see FIG. 1). An interface which detects malfunctioning of an information producer (subsystem plus corresponding interface), by means of its monitor processor 29 generates a signal which is supplied to bus system 8. The said signal is of such a nature that it is recognised by special subsystem 2a. This subsystem can then take various types of measures. One of these measures could be that subsystem 2a transmits a message reporting the problem. It is however also possible that special subsystem 2a transmits a message initiating an automatic reconfiguration of the database system. This can be achieved by defining special messages, which are recognised by certain event processors 27 of interfaces. This enables special subsystem 2a to address the said interfaces. This is the only case in which addressing techniques are used because special subsystem 2a has knowledge of the system configuration. This however does not harm normal communication among subsystems in which addressing techniques are not used. After all, a special interface is concerned which only produces data in a special situation. An event processor of an interface addressed by the special subsystem subsequently informs the corresponding subsystem of its new task.

A monitor processor 29 has been programmed by means of memory 30 in such a way that monitor processor 29 questions the corresponding subsystem if this subsystem did not interact with the interface during a certain period. If the said subsystem appears to be malfunctioning, the monitor processor may report this to special subsystem 2a. Special subsystem 2a can then take the above-mentioned measures by means of the event processors.

A monitor processor 29 may also check whether the frequency of information of a particular type presented via bus system 8 does not suddenly change. This may be caused by problems in a particular interface. It is very unlikely that the subsystem belonging to this interface is the cause of these problems because the said interface would have recorded this as described above. Monitor processor 29 in that case transmits a message to the possibly malfunctioning interface. The identity of the possibly malfunctioning interface is known thanks to parameter I, used by the possibly malfunctioning interface in the transmission of information. If the said interface does not react normally, the monitor processor which discovered this may report it to the special subsystem. The special subsystem can then again take the neccessary measures as described above.

Appendix A contains ADA code for an embodiment of the invention.

APPENDIX A

```
with CALENDAR; use CALENDAR;
with UNCHECKED_CONVERSION;

package SPLICE is type DataType is range -231..231-1;
  type Byte is range 0..255;
  type BoolArray is array(0..31) of boolean;
  type DataArray is array(0..7) of integer;
  type NodeAddress is record
          Address : BoolArray;
        end record;
  type MessageClass is (
        ExtDataRequest,
        ExtEndSubscription,
        ExtNewData,
        ExtAdvertise,
        ExtEndData,
        ExtEvent,
        MonInquiry,
        MonIamOK );
  type ApplCommand is (
        ApplDataRequest,
        ApplAllDataRequest,
        ApplNextSource,
        ApplInquire,
        ApplEndSubscription,
        ApplEnable,
        ApplDisable,
        ApplEvent,
        ApplNewData,
        ApplEndData,
        EventToHandle,
        HowAreYou );
  type MessageFormat is
        record
          Addressee    : NodeAddress;
          Class    : MessageClass;
          TypeMark      : DataType;
          Source : NodeAddress;
          TimeVal       : time;
          Qual    : integer;
          HLife   : integer;
          Data    : DataArray;
        end record;
  type ApplIntf is
        record
          Command       : ApplCommand;
```

```
            Available      : integer;
            More    : boolean;
            TypeMark        : DataType;
            Source : NodeAddress;
            TimeVal         : time;
            Qual   : integer;
            HLife  : integer;
            Data   : DataArray;
         end record;
   type DataRecord;
   type DataPointer is access DataRecord;
   type DataRecord is
         record
            DataP  : DataPointer;
            Free   : boolean;
            TypeMark        : DataType;
            Source : NodeAddress;
            TimeVal         : time;
            Passed : duration;
            AvgPassed       : duration;
            Qual   : integer;
            HLife  : integer;
            Data   : DataArray;
         end record;
   type ExtTypeRecord;
   type ExtTypePointer is access ExtTypeRecord;
   type ExtTypeRecord is
         record
            TypeP  : ExtTypePointer;
            Free   : boolean;
            TypeMark        : DataType;
            Used   : boolean;
            Unused : integer;
            Inform : boolean;
            NSources        : integer;
            DataP  : DataPointer;
         end record;
   type IntTypeRecord;
   type IntTypePointer is access IntTypeRecord;
   type IntTypeRecord is
         record
            TypeP  : IntTypePointer;
            Free   : boolean;
            TypeMark        : DataType;
            Used   : boolean;
            SubscriberCount         : integer;
            Subscribers    : NodeAddress;
            DataP  : DataPointer;
         end record;
   type EventRecord;
   type EventPointer is access EventRecord;
   type EventRecord is
         record
            EventP : EventPointer;
            Free   : boolean;
            TypeMark        : DataType;
            Enabled         : boolean;
         end record;

task ChannelOutput is
 entry Send(Message : in MessageFormat);
end ChannelOutput;
```

```
task ApplicationOutput is
  entry Interrupt(Data : in ApplIntf);
  entry HowAreYou;
end ApplicationOutput;

task ProducedData is
  entry NewData(Data : in ApplIntf);
              --> ChannelOutput.Send
  entry EndData(Data : in ApplIntf);
              --> ChannelOutput.Send
end ProducedData;

task ApplRequestHandler is
  entry Request(Data : in out ApplIntf);
              --> ChannelOutput.Send
  entry RequestAllSources(Data : in out ApplIntf);
              --> ChannelOutput.Send
  entry NextSource(Data : in out ApplIntf);
  entry Inquire(Data : in out ApplIntf);
              --> ChannelOutput.Send
  entry EndSubscription(T : in DataType);
              --> ChannelOutput.Send
  entry NewDataReceived;
end ApplRequestHandler;

task ApplEventHandler is
  entry Enable(TypeMark : in DataType);
  entry Disable(TypeMark : in DataType);
  entry Event(Data : in ApplIntf);
              --> ChannelOutput.Send
end ApplEventHandler;

task ExternalRequestHandler is
  entry Request(Message : in MessageFormat);
              --> ChannelOutput.Send
  entry EndSubscription(TypeMark : in DataType);
end ExternalRequestHandler;

task ExternalEventHandler is
  entry Event(Message : in MessageFormat);
              --> ApplicationOutput.Interrupt
end ExternalEventHandler;

task ApplicationInput is
  entry Application;
  for Application use at 16#80#;
              --> ApplRequestHandler.Request
              --> ApplRequestHandler.RequestAllSources
              --> ApplRequestHandler.Inquire
              --> ApplRequestHandler.EndSubscription
              --> ProducedData.NewData
end ApplicationInput;

task ReceivedData is
  entry NewExternalData(Message : in MessageFormat);
              --> ApplRequestHandler.NewDataReceived
              --> ExternalRequestHandler.Request
              --> ExternalRequestHandler.EndSubscription
              --> ExternalEventHandler.Event
              --> ChannelOutput.Send
end ReceivedData;
```

```
task ChannelInput is
  entry Channel;
  for Channel use at 16#90#;
              --> ReceivedData.NewExternalData
end ChannelInput;

task Monitor is
              --> ApplRequestHandler.EndSubscription
              --> ApplRequestHandler.NowDataReceived
              --> ApplOutput.HowAreYou
              --> ChannelOutput.Send
end Monitor;

for Byte'size use 8;
for NodeAddress use
      record
        Address at 0 range 0..31;
      end record;
package body SPLICE is NodeId : NodeAddress;

RequestTimeOut : duration :=1.0;
  InquiryTimeOut : duration :=1.0;
  MaxDuration : constant duration := 10000.0;
  InfiniteTimeVal       : time :=clock+MaxDuration;
  Now             : time;
  LongestSilence : duration :=1.0;
  MonitorDelay : duration :=1.0;
  LastHeardFromAppl       : time;
  ApplInquiryOutstanding : time;
  RequestOutstanding : time;
  MonInquiryOutstanding : time;
  IrregularLimit : constant integer :=100;

MaxUnused : integer :=100;

ExtTypeAdm       : ExtTypePointer;
  CurrentExtType   : ExtTypePointer;
  ExtDataAdm       : DataPointer;
  CurrentExtData   : DataPointer;
  IntTypeAdm       : IntTypePointer;
  CurrentIntType   : IntTypePointer;
  IntDataAdm       : DataPointer;
  CurrentIntData   : DataPointer;
  EventAdm         : EventPointer;
  RequestedType    : ExtTypePointer;

Message           : MessageFormat;
  ApplPanicMessage        : MessageFormat;
  MonPanicMessage         : MessageFormat;
  MonInquiryMessage       : MessageFormat;
  IamOK  : MessageFormat;

MemMappedNodeId         : integer;
  DataToAppl       : ApplIntf;
  DataFromAppl     : ApplIntf;
  ForceApplInterrupt      : Byte;
  ReleaseAppl      : Byte;

ChannelInterfaceOut       : MessageFormat;
  ChannelInterfaceIn        : MessageFormat;
```

```
ChannelActivate        : Byte;

for MemMappedNodeId use at 16#00000100#;
for DataToAppl use at 16#00100000#;
for DataFromAppl use at 16#00200000#;
for ReleaseAppl use at 16#00210000#;
for ForceApplInterrupt use at 16#00110000#;
for ChannelInterfaceOut use at 16#00300000#;
for ChannelInterfaceIn use at 16#00400000#;
for ChannelActivate use at 16#00310000#;

function IntegerToAddress is new UNCHECKED_CONVERSION(Integer,NodeAddress);

function SearchTypeExt(
        TypeMark : in DataType
        ) return DataPointer is
begin
 CurrentExtType:=ExtTypeAdm;
 loop
   if not CurrentExtType.Free and then
        CurrentExtType.TypeMark = TypeMark then
                return CurrentExtType.DataP;
   end if;
   CurrentExtType:=CurrentExtType.TypeP;
   exit when CurrentExtType = null;
 end loop;
 return null;
end SearchTypeExt;

function SearchTypeInt(
        TypeMark : in DataType
        ) return DataPointer is
begin
 CurrentIntType:=IntTypeAdm;
 loop
   if not CurrentIntType.Free and then
        CurrentIntType.TypeMark = TypeMark then
                return CurrentIntType.DataP;
   end if;
   CurrentIntType:=CurrentIntType.TypeP;
   exit when CurrentIntType = null;
 end loop;
 return null;
end SearchTypeInt;

function SearchEvent(
        TypeMark : in DataType
        ) return EventPointer is
 P : EventPointer:=EventAdm;
begin
 loop
  if not P.Free and then P.TypeMark = TypeMark then return P;
  end if;
  P:=P.EventP;
  exit when P = null;
 end loop;
 return null;
end SearchEvent;

function NextData(
        P : in DataPointer
        ) return DataPointer is
```

```
   R : DataPointer:=P;
begin
  R:=R.DataP;
  loop
    exit when R=null or else not R.Free;
    R:=R.DataP;
  end loop;
  return R;
end NextData;

function SelectBest(
        P : in DataPointer
        ) return DataPointer is
  Q,R : DataPointer;
  T : DataType;

function Better(
          Q1 : integer;
          Q2 : integer
          ) return boolean is
  begin
    if Q2 > Q1 then return true;
    else return false;
    end if;
  end Better;

begin
  if P = null then return null; end if;
  Q:=P; R:=Q; T:=P.TypeMark;
  loop
    R:=NextData(R);
    if R = null then return Q; end if;
    if Better(Q.Qual,R.Qual) then Q:=R; end if;
  end loop;
end SelectBest;

procedure ExportData(
        P : in DataPointer;
        Data : out ApplIntf
        ) is
begin
  if P = null then
    Data.Available:=0;
  else
    Data.Available:=1;
    Data.More:=false;
    Data.Source:=P.Source;
    Data.TimeVal:=P.TimeVal;
    Data.Qual:=P.Qual;
    Data.HLife:=P.HLife;
    Data.Data:=P.Data;
  end if;
end ExportData;

procedure ExportAllData(
        P : in DataPointer;
        Data : out ApplIntf
        ) is
  Q : DataPointer:=P;
begin
  if Q = null then
    Data.Available:=0;
```

BEST AVAILABLE COPY

```
    else
     Data.Available:=CurrentExtType.NSources;
     Q:=NextData(Q);
     if Q = null then
      Data.More:=false;
     else
      Data.More:=true;
     end if;
     Data.Source:=Q.Source;
     Data.TimeVal:=Q.TimeVal;
     Data.Qual:=Q.Qual;
     Data.HLife:=Q.HLife;
     Data.Data:=Q.Data;
    end if;
end ExportAllData;

procedure ImportDataInt(
        D : in ApplIntf;
        P : in DataPointer
        ) is
begin
  P.TypeMark:=D.TypeMark;
  P.Source:=(Address => (others => false));
  P.TimeVal:=D.TimeVal;
  P.Qual:=D.Qual;
  P.HLife:=D.HLife;
  P.Data:=D.Data;
end ImportDataInt;

function CreateExtDataItem(
        P : in DataPointer
        ) return DataPointer is
begin
  P.DataP:= new DataRecord'(
        DataP     => null,
        Free      => true,
        TypeMark  => 0,
        Source    => (Address => (others => false)),
        TimeVal   => Now,
        Passed    => 0.0,
        AvgPassed => 0.0,
        Qual      => 0,
        HLife     => 0,
        Data      => (others => 0) );
  return P.DataP;
end CreateExtDataItem;

procedure ImportDataExt(
        M : in MessageFormat;
        P : in DataPointer;
        T : in ExtTypePointer) is
  Q : DataPointer:=P;
  R,S : DataPointer;
begin
  S:=null;
  loop
    exit when not Q.Free and then Q.Source = M.Source;
    if Q.Free then
      S:=Q;
    end if;
    R:=Q.DataP;
    if R = null then
```

```
     if S = null then
      Q:=CreateExtDataItem(Q);
     else
      Q:=S;
     end if;
     T.NSources:=T.NSources+1;
     exit;
    end if;
   Q:=R;
  end loop;
  Q.TypeMark:=M.TypeMark;
  Q.Source:=M.Source;
  Q.Passed:=M.TimeVal-Q.TimeVal;
  Q.TimeVal:=M.TimeVal;
  Q.Qual:=M.Qual;
  Q.HLife:=M.HLife;
  Q.Data:=M.Data;
 end ImportDataExt;

procedure FormDataMessage(
         P : in DataPointer;
         M : out MessageFormat
         ) is
 begin
  M.Addressee:=CurrentIntType.Subscribers;
  M.Class:=ExtNewData;
  M.TypeMark:=P.TypeMark;
  M.Source:=NodeId;
  M.TimeVal:=P.TimeVal;
  M.Qual:=P.Qual;
  M.HLife:=P.HLife;
  M.Data:=P.Data;
 end FormDataMessage;

procedure FormDataFromMessage(
         M : in MessageFormat;
         D : out ApplIntf
         ) is
 begin
  D.Available:=1;
  D.TypeMark:=M.TypeMark;
  D.Source:=M.Source;
  D.TimeVal:=M.TimeVal;
  D.Qual:=M.Qual;
  D.HLife:=M.HLife;
  D.Data:=M.Data;
 end FormDataFromMessage;

procedure FormExtRequest(
         TypeMark : in DataType;
         M : out MessageFormat
         ) is
 begin
  M.Addressee.Address:=(others => true);
  M.Class:=ExtDataRequest;
  M.TypeMark:=TypeMark;
  M.Source:=NodeId;
 end FormExtRequest;

procedure FormEventMessage(
         D : in ApplIntf;
         M : out MessageFormat
```

```
                ) is
begin
 M.Class:=ExtEvent;
 M.Addressee.Address:=(others => true);
 M.TypeMark:=D.TypeMark;
 M.Source:=NodeId;
 M.TimeVal:=D.TimeVal;
 M.Data:=D.Data;
end FormEventMessage;

function CreateExtTypeItem(
        T : in DataType
        ) return DataPointer is
  P : ExtTypePointer;
begin
 P:=ExtTypeAdm; CurrentExtType:=ExtTypeAdm;
 loop
  exit when P = null or else P.Free;
  CurrentExtType:=P;
  P:=P.TypeP;
 end loop;
 if P = null then
  CurrentExtType.TypeP:= new ExtTypeRecord'(
        TypeP    => null,
        Free     => true,
        TypeMark => 0,
        Used     => false,
        Unused   => 0,
        Inform   => false,
        NSources => 0,
        DataP    => null );
  CurrentExtType:=CurrentExtType.TypeP;
 else
  CurrentExtType:=P;
 end if;
 CurrentExtType.Free:=false;
 CurrentExtType.TypeMark:=T;
 CurrentExtType.Used:=false;
 CurrentExtType.NSources:=0;
 CurrentExtType.DataP:=null;
 CurrentExtType.TypeP.DataP:= new DataRecord'(
        DataP    =>null,
        Free     => true,
        TypeMark => 0,
        Source   => (Address => (others => false)),
        TimeVal  => Now,
        Passed   => 0.0,
        AvgPassed => 0.0,
        Qual     => 0,
        HLife    => 0,
        Data     => (others => 0) );
 return CurrentExtType.TypeP.DataP;
end CreateExtTypeItem;

function CreateIntDataItem(
        T : in DataType
        ) return DataPointer is
  P : DataPointer;
  Q : IntTypePointer;
begin
 Q:=IntTypeAdm; CurrentIntType:=IntTypeAdm;
```

```
loop
 exit when Q = null or else Q.Free;
 CurrentIntType:=Q;
 Q:=Q.TypeP;
end loop;
if Q = null then
 CurrentIntType.TypeP:= new IntTypeRecord'(
        TypeP    => null,
        Free     => true,
        TypeMark         => 0,
        Used     => false,
        SubscriberCount         => 0,
        Subscribers     => (Address => (others => false)),
        DataP    => null );
 CurrentIntType:=CurrentIntType.TypeP;
else
 CurrentIntType:=Q;
end if;
P:=IntDataAdm; CurrentIntData:=IntDataAdm;
loop
 exit when P = null or else P.Free;
 CurrentIntData:=P;
 P:=P.DataP;
end loop;
if P = null then
 CurrentIntData.DataP:= new DataRecord'(
        DataP    =>null,
        Free     => true,
        TypeMark         => 0,
        Source   => NodeId,
        TimeVal          => Now,
        Passed => 0.0,
        AvgPassed        => 0.0,
        Qual     => 0,
        HLife    => 0,
        Data     => (others => 0) );
  CurrentIntData:=CurrentIntData.DataP;
 else
  CurrentIntData:=P;
 end if;
 CurrentIntType.DataP:=CurrentIntData;
 CurrentIntData.Free:=false;
 CurrentIntData.TypeMark:=T;
 CurrentIntType:=IntTypeAdm;
 return CurrentIntData;
end CreateIntDataItem;

function CreateEventItem(
        T : in DataType
        ) return EventPointer is
P : EventPointer:=EventAdm;
begin
 loop
  if P.Free then
   P.Free:=false;
   P.TypeMark:=T;
   P.Enabled:=false;
   return P;
  end if;
  P:=P.EventP;
  exit when P=null;
```

```
  end loop;
  P.EventP:= new EventRecord'(
        EventP    -> null,
        Free      => true,
        TypeMark  -> 0,
        Enabled   => false );
  return P.EventP;
end CreateEventItem;

task body ChannelOutput is
begin
 loop
  accept Send(Message : in MessageFormat) do
    ChannelInterfaceOut:=Message;
    ChannelActivate:=1;
  end Send;
 end loop;
end ChannelOutput;

task body ApplicationOutput is
begin
 loop
  select
    accept Interrupt(Data : in ApplIntf) do
     DataToAppl:=Data;
     DataToAppl.Command:=EventToHandle;
    end Interrupt;
    ForceApplInterrupt:=1;
  or
    accept HowAreYou;
    DataToAppl.Command:=HowAreYou;
    ForceApplInterrupt:=1;
  end select;
 end loop;
end ApplicationOutput;

task body ProducedData is
 D : ApplIntf;
 P : DataPointer;
 M : MessageFormat;
 T : DataType;
 N : integer;
begin
 loop
  select
   accept NewData(Data : in ApplIntf) do
    D:=Data;
   end NewData;
   P:=SearchTypeInt(D.TypeMark);
   if P = null then
    P:=CreateIntDataItem(D.TypeMark);
    M.Class:=ExtAdvertise;
    M.Addressee.Address:=(others => true);
    M.TypeMark:=D.TypeMark;
    M.Source:=NodeId;
    ChannelOutput.Send(M);
   end if;
   ImportDataInt(D,P);
   if CurrentIntType.SubscriberCount > 0 then
    FormDataMessage(P,M);
    ChannelOutput.Send(M);
   end if;
```

```
    or
     accept EndData(Data : in ApplIntf) do
       T:=Data.TypeMark;
     end EndData;
     P:=SearchTypeInt(T);
     if P /= null and then CurrentIntType.SubscriberCount > 0 then
       M.Class:=ExtEndData;
       M.Addressee:=CurrentIntType.Subscribers;
       ChannelOutput.Send(M);
       CurrentIntType.SubscriberCount:=0;
       CurrentIntType.Subscribers:=(Address => (others => false));
     end if;
    end select;
   end loop;
end ProducedData;

task body ApplRequestHandler is
 Message : MessageFormat;
 P : DataPointer;
 TypeMark : DataType;

procedure RemoveExtDataItem(T : in DataType) is
  P : DataPointer;
  N : integer;
 begin
  N:=CurrentExtType.NSources;
  P:=CurrentExtType.DataP;
  Message.Addressee.Address:=(others => false);
  Message.Class:=ExtEndSubscription;
  Message.TypeMark:=T;
  Message.Source:=NodeId;
  loop
   P.Free:=true;
   Message.Addressee.Address:=Message.Addressee.Address or
       P.Source.Address;
   P:=NextData(P);
   N:=N-1;
   exit when N = 0;
  end loop;
  ChannelOutput.Send(Message);
  CurrentExtType.Free:=true;
 end RemoveExtDataItem;

begin
 loop
  select
   accept Request(Data : in out ApplIntf) do
    P:=SearchTypeExt(Data.TypeMark);
    if P = null then
     FormExtRequest(Data.TypeMark,Message);
     P:=CreateExtTypeItem(Data.TypeMark);
     RequestedType:=CurrentExtType;
     RequestedType.Inform:=true;
     RequestOutstanding:=clock+RequestTimeOut;
     ChannelOutput.Send(Message);
     accept NewDataReceived;
     if RequestedType.NSources = 0 then
      P:=null;
     end if;
    end if;
    P:=SelectBest(P);
    CurrentExtType.Used:=true;
```

```
    ExportData(P,Data);
   end Request;
  or
   accept RequestAllSources(Data : in out ApplIntf) do
    P:=SearchTypeExt(Data.TypeMark);
    if P = null then
     FormExtRequest(Data.TypeMark,Message);
     P:=CreateExtTypeItem(Data.TypeMark);
     RequestedType:=CurrentExtType;
     RequestedType.Inform:=true;
     RequestOutstanding:=clock+RequestTimeOut;
     ChannelOutput.Send(Message);
     accept NewDataReceived;
     if RequestedType.NSources = 0 then
      P:=null;
     end if;
    end if;
    CurrentExtType.Used:=true;
    ExportAllData(P,Data);
   end RequestAllSources;
  or
   accept NextSource(Data : in out ApplIntf) do
    P:=NextData(P);
    if P /= null then
     ExportAllData(P,Data);
    else
     Data.Available:=0;
    end if;
   end NextSource;
  or
   accept Inquire(Data : in out ApplIntf) do
    P:=SearchTypeExt(Data.TypeMark);
    if P = null then
      Data.Available:=0;
      TypeMark:=Data.TypeMark;
     else
      Data.Available:=CurrentExtType.NSources;
     end if;
    end Inquire;
    if P = null then
     FormExtRequest(TypeMark,Message);
     P:=CreateExtTypeItem(TypeMark);
     ChannelOutput.Send(Message);
    end if;
   or
    accept EndSubscription(T : in DataType) do
     TypeMark:=T;
    end EndSubscription;
    P:=SearchTypeExt(TypeMark);
    if P /= null then
     RemoveExtDataItem(TypeMark);
    end if;
   end select;
  end loop;
 end ApplRequestHandler;

task body ApplEventHandler is
  EventType : DataType;
  P : EventPointer;
  Message : MessageFormat;
 begin
```

```
loop
 select
  accept Enable(TypeMark : in DataType) do
   EventType:=TypeMark;
  end Enable;
  P:=SearchEvent(EventType);
  if P = null then
   P:=CreateEventItem(EventType);
  end if;
  P.Enabled:=true;
 or
  accept Disable(TypeMark : in DataType) do
   EventType:=TypeMark;
  end Disable;
  P:=SearchEvent(EventType);
  if P /= null then
   P.Enabled:=false;
  end if;
 or
  accept Event(Data : in ApplIntf) do
   FormEventMessage(Data,Message);
  end Event;
  ChannelOutput.Send(Message);
 end select;
end loop;
end ApplEventHandler;

task body ExternalRequestHandler is
 M : MessageFormat;
 T : DataType;
 P : DataPointer;
begin
 loop
  select
   accept Request(Message : in MessageFormat) do
    M:=Message;
   end Request;
   P:=SearchTypeInt(M.TypeMark);
   if P /= null then
    CurrentIntType.SubscriberCount:=CurrentIntType.SubscriberCount+1;
    CurrentIntType.Subscribers.Address:=
        CurrentIntType.Subscribers.Address or M.Source.Address;
    FormDataMessage(P,M);
    ChannelOutput.Send(M);
   end if;
  or
   accept EndSubscription(TypeMark : in DataType) do
    T:=TypeMark;
   end EndSubscription;
   P:=SearchTypeInt(T);
   if P /= null and then CurrentIntType.SubscriberCount>0 then
    CurrentIntType.SubscriberCount:=CurrentIntType.SubscriberCount-1;
   end if;
  end select;
 end loop;
end ExternalRequestHandler;

task body ExternalEventHandler is
 M : MessageFormat;
 P : EventPointer;
 D : ApplIntf;
```

```
begin
 loop
   accept Event(Message : in MessageFormat) do
     M:=Message;
   end Event;
   P:=SearchEvent(M.TypeMark);
   if P /= null and then P.Enabled then
     FormDataFromMessage(M,D);
     P.Enabled:=false;
     ApplicationOutput.Interrupt(D);
   end if;
 end loop;
end ExternalEventHandler;

task body ApplicationInput is
begin
 loop
  accept Application do
   LastHeardFromAppl:=Now;
   ApplInquiryOutstanding:=InfiniteTimeVal;
   case DataFromAppl.Command is
    when ApplDataRequest =>
       ApplRequestHandler.Request(DataFromAppl);
    when ApplAllDataRequest =>
       ApplRequestHandler.RequestAllSources(DataFromAppl);
    when ApplNextSource =>
       ApplRequestHandler.NextSource(DataFromAppl);
    when ApplInquire =>
       ApplRequestHandler.Inquire(DataFromAppl);
    when ApplEndSubscription =>
       ApplRequestHandler.EndSubscription(DataFromAppl.TypeMark);
    when ApplEnable =>
       ApplEventHandler.Enable(DataFromAppl.TypeMark);
    when ApplDisable =>
       ApplEventHandler.Disable(DataFromAppl.TypeMark);
    when ApplEvent =>
       ApplEventHandler.Event(DataFromAppl);
    when ApplNewData =>
       ProducedData.NewData(DataFromAppl);
    when ApplEndData =>
       ProducedData.EndData(DataFromAppl);
    when others =>
       null;
   end case;
  end Application;
  ReleaseAppl:=0;
 end loop;
end ApplicationInput;

task body ReceivedData is
 M : MessageFormat;
 P : DataPointer;
 T : ExtTypePointer;
begin
 loop
  accept NewExternalData(Message : in MessageFormat) do
    M:=Message;
  end NewExternalData;
  case M.Class is
   when ExtDataRequest =>
      ExternalRequestHandler.Request(M);
   when ExtEndSubscription =>
```

```
                ExternalRequestHandler.EndSubscription(M.TypeMark);
        when ExtNewData =>
             P:=SearchTypeExt(M.TypeMark);
             T:=CurrentExtType;
             if P /= null then
              T.Used:=false;
              ImportDataExt(M,P,T);
              if T.Inform then
               RequestOutstanding:=InfiniteTimeVal;
               T.Inform:=false;
               select
                ApplRequestHandler.NewDataReceived;
               else
                null;
               end select;
              end if;
             end if;
        when ExtAdvertise =>
             P:=SearchTypeExt(M.TypeMark);
             T:=CurrentExtType;
             if P /= null then
              loop
                exit when P = null or else P.Source = M.Source;
                P:=P.DataP;
              end loop;
              if P = null then
               if T = RequestedType and then T.Inform then
                RequestOutstanding:=clock+RequestTimeOut;
               end if;
               M.Class:=ExtDataRequest;
               M.Addressee:=M.Source;
               ChannelOutput.Send(M);
              end if;
             end if;
        when ExtEndData =>
             P:=SearchTypeExt(M.TypeMark);
             loop
               exit when P = null;
               if P.Source = M.Source then
                P.Free:=true;
                exit;
               end if;
               P:=P.DataP;
             end loop;
        when ExtEvent =>
             ExternalEventHandler.Event(M);
        when MonInquiry =>
             ChannelOutput.Send(IamOK);
        when MonIamOK =>
             MonInquiryOutstanding:=InfiniteTimeVal;
      end case;
     end loop;
    end ReceivedData;

task body ChannelInput is
     M : MessageFormat;
    begin
     loop
      accept Channel do
       M:=ChannelInterfaceIn;
      end Channel;
```

```
   if (M.Addressee.Address and NodeId.Address) = NodeId.Address then
     ReceivedData.NewExternalData(M);
   end if;
  end loop;
 end ChannelInput;

function ComputeQuality(D : in DataPointer) return integer is
  Q : integer;
 begin
  Q:=D.Qual;
  return Q;
 end;

task body Monitor is
  P : ExtTypePointer;
  D : DataPointer;
 begin
  loop
   Now:=clock;
   if Now > RequestOutstanding then
    RequestOutstanding:=InfiniteTimeVal;
    RequestedType.Inform:=false;
    select
     ApplRequestHandler.NewDataReceived;
    else
     null;
    end select;
   end if;
   if Now > LastHeardFromAppl+LongestSilence then
    ApplInquiryOutstanding:=Now+InquiryTimeOut;
    ApplicationOutput.HowAreYou;
   end if;
   if Now > ApplInquiryOutstanding then
    ApplPanicMessage.TimeVal:=Now;
    ChannelOutput.Send(ApplPanicMessage);
    ApplInquiryOutstanding:=InfiniteTimeVal;
   end if;
   if Now > MonInquiryOutstanding then
    MonPanicMessage.TimeVal:=Now;
    ChannelOutput.Send(MonPanicMessage);
    MonInquiryOutstanding:=InfiniteTimeVal;
   end if;
   P:=ExtTypeAdm;
   loop
    if not P.Free then
     D:=P.DataP;
     loop
      if not D.Free then
       D.Qual:=ComputeQuality(D);
       if D.AvgPassed /= 0.0 and then
            Now > D.TimeVal + IrregularLimit*D.AvgPassed then
        MonInquiryMessage.Addressee:=D.Source;
        MonInquiryOutstanding:=Now+InquiryTimeOut;
        ChannelOutput.Send(MonInquiryMessage);
        D.AvgPassed:= 0.0;
       end if;
       D.AvgPassed:=(D.AvgPassed+D.Passed)/2;
      end if;
      D:=D.DataP;
      exit when D = null;
     end loop;
    end if;
```

```
     P:=P.TypeP;
     exit when P = null;
   end loop;
   P:=ExtTypeAdm;
   loop
     if not P.Free then
       if P.Used then
         P.Unused:=0;
       else
         P.Unused:=P.Unused+1;
         if P.Unused > MaxUnused then
           ApplRequestHandler.EndSubscription(P.TypeMark);
         end if;
       end if;
     end if;
   end loop;
   InfiniteTimeVal:=clock+MaxDuration;
   delay MonitorDelay;
  end loop;
end Monitor;

begin

RequestOutstanding:=InfiniteTimeVal;
ApplInquiryOutstanding:=InfiniteTimeVal;
MonInquiryOutstanding:=InfiniteTimeVal;
NodeId:=IntegerToAddress(MemMappedNodeId);
Now := clock;
ExtTypeAdm := new ExtTypeRecord'(
       TypeP  => null,
       Free   => true,
       TypeMark    => 0,
       Used   => false,
       Unused => 0,
       Inform => false,
       NSources    => 0,
       DataP  => null );
ExtDataAdm := new DataRecord'(
       DataP  =>null,
       Free   => true,
       TypeMark    => 0,
       Source => (Address => (others => false)),
       TimeVal     => Now,
       Passed => 0.0,
       AvgPassed   => 0.0,
       Qual   => 0,
       HLife  => 0,
       Data   => (others => 0) );
IntTypeAdm := new IntTypeRecord'(
       TypeP  => null,
       Free   => true,
       TypeMark    => 0,
       Used   => false,
       SubscriberCount     => 0,
       Subscribers    => (Address=> (others => false)),
       DataP  => null );
IntDataAdm := new DataRecord'(
       DataP  => null,
       Free   => true,
       TypeMark    => 0,
       Source => (Address => (others => false)),
```

```
        TimeVal         -> Now,
        Passed  => 0.0,
        AvgPassed       -> 0.0,
        Qual    -> 0,
        HLife   => 0,
        Data    => (others -> 0) );
EventAdm := new EventRecord'(
        EventP  => null,
        Free    => true,
        TypeMark        => 0,
        Enabled => false );
ApplPanicMessage:=((Address -> (others -> true)),ExtEvent,999999,
        NodeId,Now,0,0,(others => 0));
MonInquiryMessage:=((Address -> (others -> false)),MonInquiry,888888,
        NodeId,Now,0,0,(others -> 0));
IamOK:=((Address -> (others -> false)),MonIamOK,888888,
        NodeId,Now,0,0,(others => 0));
MonPanicMessage:=((Address -> (others -> true)),ExtEvent,888888,
        NodeId,Now,0,0,(others => 0));

end SPLICE;
```

BEST AVAILABLE COPY

I claim:

1. A communication system comprising:

a plurality of subsystems each of which is for producing and processing one or more types of information; each subsystem comprising means for requesting information by including in such a request an indication of the type of information desired, and means for supplying information produced by said subsystem and including therein an indication of the type of the produced information;

a bus system; and a plurality of interfaces respectively coupling the respective subsystems to said bus system, the interface for each subsystem comprising:

(a) subscription means including respective means for (i) receiving from said subsystem an initial request for a desired type of information, storing in first memory means the indication in said request of the desired type of information, and supplying said indication of the desired type of information to said bus system;

(ii) accepting the desired type of information from said bus system each time it is provided therefrom following said initial request, as identified by an information type indication as in such request, and storing said desired type of information so accepted from said bus system in second memory means; and (iii) supplying said desired type of information from said second memory to said subsystem following said initial request therefor; and further supplying to said subsystem, in response to subsequent requests therefrom for said desired type of information, information of that desired type in said second memory means at the times of such subsequent requests;

(b) means for storing in third memory means information produced by said subsystem, including an indication of the type of the produced information;

(c) means for supplying a type of produced information which is stored in said third memory means to said bus system in response to a request received from said bus system for information of such produced type, and (d) means for further supplying said type of produced information stored in said third memory to said bus system each time said type of produced information is produced by said subsystem;

(e) means for producing a quality indication for information produced by said subsystem and which signifies the quality of such produced information according to a predetermined definition;

(f) means for including the applicable quality information with produced information supplied by said interface to said bus system;

(g) means for storing and overwriting information received from the bus system with quality indications applicable thereto; and (h) means for supplying to said subsystem, each time it requests a type of information, the stored information of such type having the highest quality indication;

whereby the subsystems communicate with each other in real time without requiring information about the configuration of said system and without requiring the address of any subsystem;

whereby the subsystems operate independently and continue to produce and process information in the event of partially failure of the system without need for a duplicate system; and wherein the quality indication comprises instantaneous quality information $Q_o$, durability information $\tau$, and time information $t_o$, where the instantaneous quality information $Q_o$ indicates quality of the produced information at a time denoted by the time information $t_o$ according to said predetermined definition and where the durability information $\tau$ indicates a time interval during which the instantaneous quality information $Q_o$ remains valid.

2. An interface for use in a communication system which includes
  a) a bus system,
  b) a plurality of subsystems, each of which produces and processes one or more types of information, each type of produced information including an indication of this type, and
  c) a plurality of said interfaces which respectively couple the respective subsystems to said bus system; the interface for each subsystem comprising subscription means including respective means for:
    (i) receiving from said subsystem an initial request for a desired type of information, storing in first memory means the indication in said request of the desired type of information, and supplying said indication of the desired type of information to said bus system;
    (ii) accepting the desired type of information from said bus system each time it is provided thereform following said initial request, as identified by an information type indication as in such request, and storing said desired type information so accepted from said bus system in second memory means; and
    (iii) supplying said desired type of information from said second memory to said subsystem following said initial request therefor; and further supplying to said subsystem, in response to subsequent requests therefrom for said desired type of information, information of that desired type in said second memory means at the times of such subsequent requests;

whereby the subsystems operate independently and continue to process information in the event of partial failure of the system without need for a duplicate system;

the interface for each subsystem further comprising:

means for producing respective produced information quality indications for respective types of produced information stored in said first memory means, such quality indications representing the quality of the produced information according to a predetermined definition; and means for including such a quality indication with each respective type of produced information supplied to the bus system by said interface.

wherein the quality indication comprises instantaneous quality information $Q_o$, durability information $\tau$, the time information $t_o$, where the instantaneous quality information $Q_o$ indicates quality of the produced information at a time denoted by the time information $t_o$ according to said predetermined definition and where the durability information $\tau$ indicates a time interval during which the instantaneous quality information $Q_o$ remains valid.

3. An interface for use in a communication system which includes
  a) a bus system,
  b) a plurality of subsystems, each of which produces and processes one or more types of information, each type of produced information including an indication of this type, and
  c) a plurality of said interfaces which respectively couple the respective subsystems to said bus system; the interface for each subsystem comprising subscription means including respective means for:
    (i) receiving from said subsystem an initial request for a desired type of information, storing in first memory means the indication in said request of the desired type of information, and supplying said indication of the desired type of information to said bus system;
    (ii) accepting the desired type of information from said bus system each time it is provided therefrom following said initial request, as identified by an information type indication as in such request, and storing said desired type information so accepted from said bus system in second memory means; and
    (iii) supplying said desired type of information from said second memory of said subsystem following said initial request therefor; and further supplying to said subsystem, in response to subsequent requests therefrom for said desired type of information, information of that desired type in said second memory means at the times of such subsequent requests;

whereby the subsystems operate independently and continue to process information in the event of partial failure of the system without need for a duplicate system;

the interface for each subsystem further comprising:

means for including a quality indication with each respective type of information produced by said subsystem and stored in said first memory, such quality indication being in accordance with predetermined indicia of quality;

means for accepting from said bus system and stored in a second memory information of a type indicated in a first request from said subsystem for desired information, said type of desired information being so accepted and stored each time it is provided by said bus system following said first request therefor and until said subsystem provides a stop order indicating said type of desired information; and means for supplying to said subsystem, in response to a subsequent request therefrom for said type of desired information, information of said type which is selected from among all information of said type stored in said second memory, said selection being made on the basis of the respective quality indications of the stored information of said type;

wherein the quality indication comprises instantaneous quality information $Q_o$, durability information $\tau$, and time information $t_o$, where the instantaneous quality information $Q_o$ indicates quality of the produced information at a time denoted by time information $t_o$ according to said predetermined definition and where the durability information $\tau$ indicates a time interval during which the instantaneous quality information $Q_o$ remains valid.

4. A method for managing data exchanged between subsystems, comprising the steps of:

naming data types associated with said data:

accepting, by a producing interface associated with a producing subsystem, data produced by said producing subsystem, wherein the data produced by said producing subsystem is produced a plurality of times over a predetermined time period;

accepting, by a consuming interface associated with a consuming subsystem, a request from said consuming subsystem for data associated with one of said named data types;

matching the named data type associated with said produced data with the named data type associated with said request, wherein after the matching step is performed, the matching step is repeated only when there is at least one of a change in the request from said consuming subsystem and a change in data produced by said producing subsystem;

transmitting said data accepted by said producing interface which has the matched name data type associated with said request to said consuming interface each of said plurality of times said data is produced; and transmitting said data which has been transmitted to said consuming interface to said consuming subsystem;

wherein said step of accepting, by a producing interface, data produced by said producing subsystem and said step of transmitting data from said producing interface to said consuming interface are performed each of said times said producing subsystem produces data which has the matched name type associated with said request.

5. A method according to claim 4, further comprising the steps of:

accepting by a second producing interface associated with a second producing subsystem, second data produced by said second producing subsystem; and determining a merit of at least one predetermined characteristic of said first data and said second data;

wherein:

the matching step matches the named data type associated with both said first produced data and said second produced data with the named data type associated with said request;

the step of transmitting said first data to said consuming interface transmits both said first data and said second data accepted by said first producing interface and said second producing interface respectively, which has the matched name data type associated with said request to said consuming interface; and the step of transmitting said data to said consuming subsystem from said consuming interface transmits the data from the consuming interface which has a higher merit of the predetermined characteristic.

6. A method for managing data exchanged between subsystems, comprising the steps of:

naming data types associated with said data;

accepting, by a producing interface associated with a producing subsystem, data produced by said producing subsystem, wherein the data produced by said producing subsystem is produced a plurality of times over a predetermined time period;

establishing a subscription serve for a consuming subsystem which automatically forwards one of said named data types from the producing subsystem to the producing interface to a consuming interface associated with the consuming subsystem without a request being transmitted to the producing interface each time said named type of data is desired by said consuming subsystem, by performing the substeps of:

accepting, by said consuming interface associated with said consuming subsystem, a subscription request from said consuming subsystem for a subscription service to be established between said producing interface and said consuming interface for data associated with one of said named data types; and matching the named data type associated with said produced data with the named data type associated with said subscription request, wherein after the matching step is performed, the matching step is not repeated unless new communication requirements are made;

transmitting said data accepted by said producing interface which has the matched named data type associated with said subscription request to said consuming interface each of said plurality of times said data is produced without performing the matching substep each time the data is transmitted from the producing interface to the consuming interface; and transmitting said data which has been transmitted to said consuming interface to said consuming subsystem whenever said consuming subsystem makes a request for said named type of data for which the subscription service has been established;

wherein after the subscription service has been established, said step of accepting, by said producing interface, data produced by said producing subsystem and said step of transmitting data from said producing interface to said consuming interface are performed each of said times said producing subsystem produces data.

7. A method according to claim 6, further comprising the steps of:

accepting by a second producing interface associated with a second producing subsystem, second data produced by said second producing subsystem; and determining a merit of at least one predetermined characteristic of said first data nd said second data;

wherein:

the matching substep matches the named data type associated with both said first produced data and said second produced data with the named data type associated with said subscription request;

the step of transmitting said first data to said consuming interface transmits both said first data and said second data accepted by said first producing interface and said second producing interface respectively, which has the matched name data type associated with said subscription request; and the step of transmitting said data to said consuming subsystem from said consuming interface transmits the data from the first and second producing interface which has a higher merit of the predetermined characteristic.

8. An apparatus for managing data exchanged between subsystems, comprising:

means for naming data types associated with said data;

a producing interface, associated with a producing subsystem, for accepting data produced by said producing subsystem, wherein the data produced by said producing subsystem is produced a plurality of times over a predetermined time period;

a consuming interface, associated with a consuming subsystem, for accepting a request from said consuming subsystem for data associated with one of said named data types;

matching means for matching the named data type associated with said produced data with the named data type associated with said request, wherein after the matching is performed by the matching means, the matching is repeated only when there is at least one of a change in the request from said consuming subsystem and a change in data produced by said producing subsystem;

wherein said producing interface transmits said data accepted by said producing interface which has the matched name data type associated with said request to said consuming interface each of said plurality of times said data is produced;

wherein said consuming interface transmits said data which as been transmitted to said consuming interface to said consuming subsystem; and wherein said accepting by said producing interface of said data produced by said producing subsystem and said transmitting of data from said producing interface to said consuming interface is performed each of said times said producing subsystem produces data.

9. An apparatus according to claim 8, further comprising:
a second producing interface associated with a second producing subsystem, for accepting second data produced by said second producing subsystem and for transmitting the second data which has the matched named data type to the consuming interface; and means for determining a merit of at least one predetermined characteristic of said first data and said second data;

wherein the means for matching matches the named data type associated with both said first produced data and said second produced data with the named data type associated with said request; and wherein said consuming interface transmits one of the data from the first and second producing interface which has a higher merit of the predetermined characteristic to said consuming subysstem.

10. An apparatus for managing data exchanged between subsystems, comprising:
means for naming data types associated with said data;

a producing interface associated with a producing subsystem, for accepting data produced by said producing subsystem, wherein the data produced by said producing subsystem is produced a plurality of times over a predetermined time period;

a subscription means for establishing a subscription service for a consuming subsystem which automatically forwards one of said named data types from the producing subsystem to the producing interface to a consuming interface associated with the consuming subsystem without a request being transmitted to the producing interface each time said named type of data is desired by said consuming subsystem, by performing the steps of:

accepting, by said consuming interface associated with said consuming subsystem, a subscription request from said consuming subsystem for data associated with one of said named data types; and matching the named data type associated with said produced data with the named data type associated with subscription request, wherein after the matching step is performed, the matching step is not repeated unless new communication requirements are made;

wherein said producing interface transmits said data accepted by said producing interface which has the matched named data type associated with said request to said consuming interface each of said plurality of times said data is produced without the subscription means performing the matching step each time the data is transmitted from the producing interface to the consuming interface; and wherein said consuming interface transmits said data which has been transmitted thereto to said consuming subsystem whenever said consuming subsystem makes a request for said named type of data for which the subscription service has been established;

wherein after the subscription service has been established by said subscription means, the data associated with the named data type is transmitted from the producing subsystem to the producing interface to the consuming interface each time said producing subsystem produces data associated with the named type matched by the subscription means.

11. An apparatus according to claim 10, further comprising:
a second producing interface associated with a second producing subsystem, for accepting second data produced by said second producing subsystem and for transmitting the second data which has the matched named data type to the consuming interface; and means for determining a merit of at least one predetermined characteristic of said first data and said second data;

wherein the matching step performed by the subscription means matches the named data type associated with both said first produced data and said second produced data with the named data type associated with said request for said named type of data;

wherein said consuming interface transmits one of the data from the first and second producing interface which has a higher merit of the predetermined characteristic to said consuming subysstem.

* * * * *